March 3, 1953  E. S. HISCAR  2,630,517
CIGAR LIGHTER FOR USE IN AUTOMOTIVE VEHICLES
Filed May 29, 1951  2 SHEETS—SHEET 1
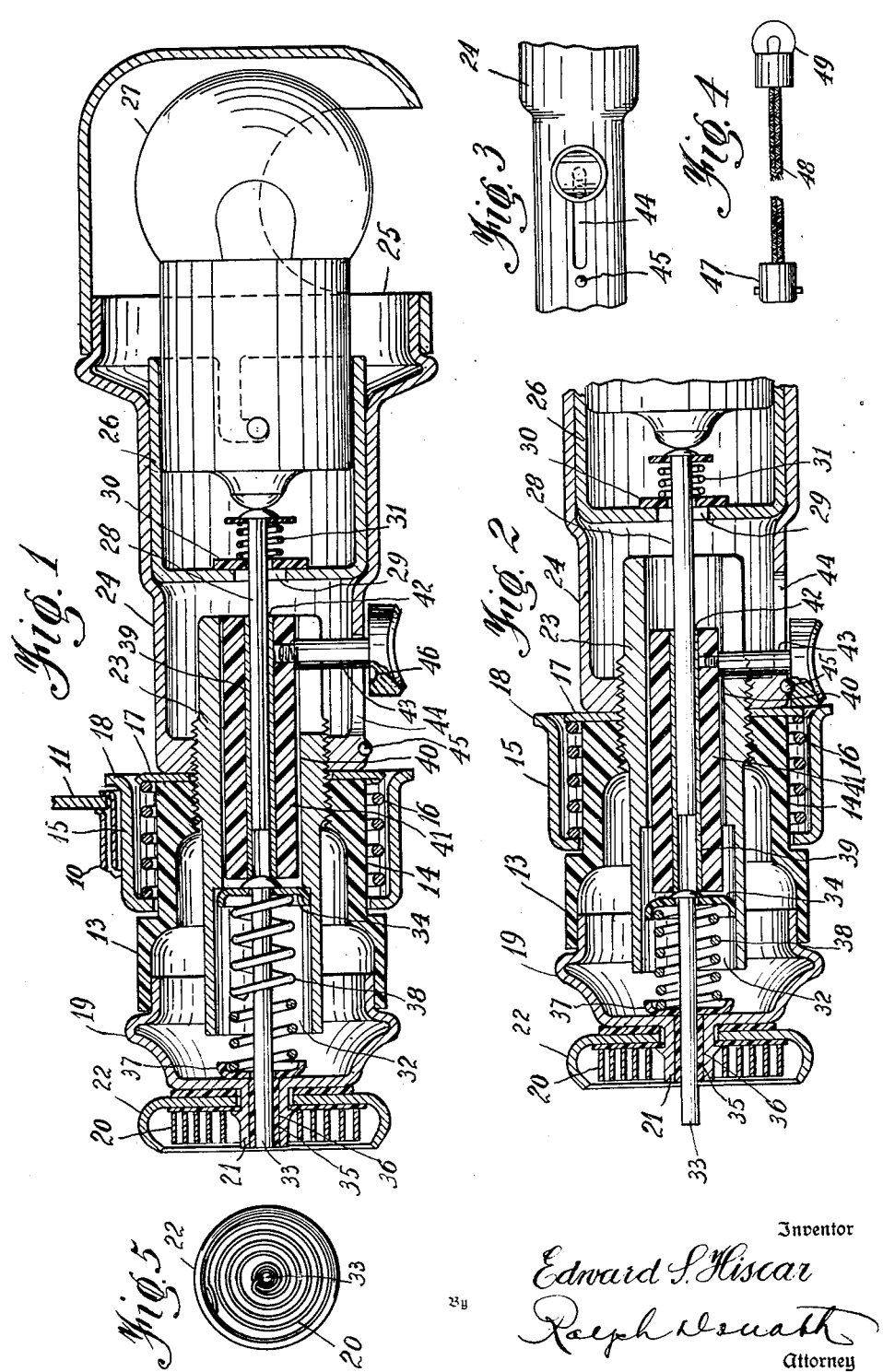
Inventor
Edward S. Hiscar
By Ralph Deuath
Attorney

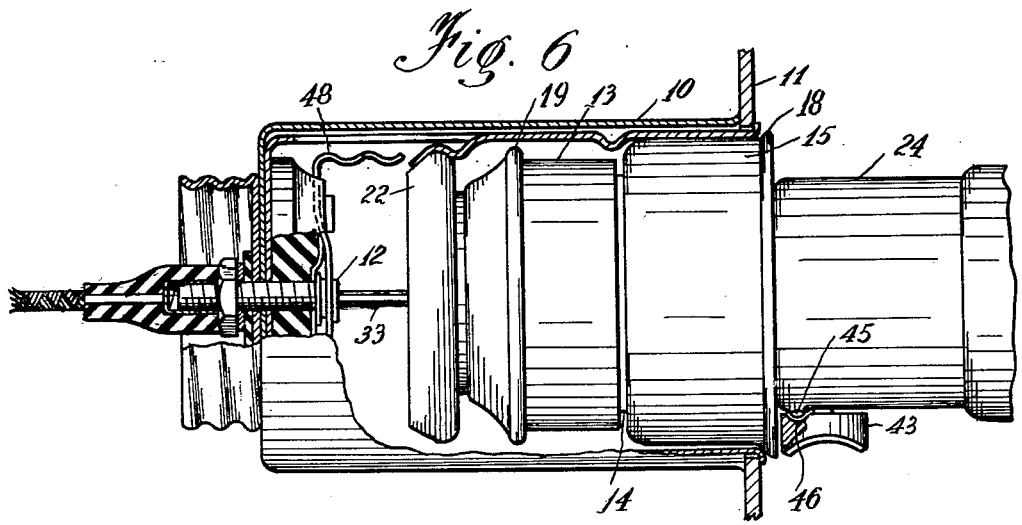
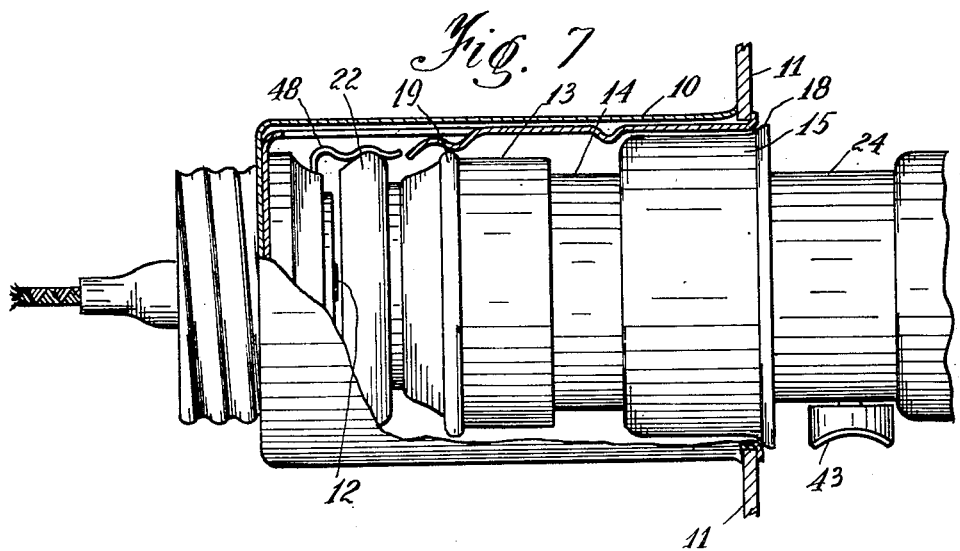

Patented Mar. 3, 1953

2,630,517

UNITED STATES PATENT OFFICE 2,630,517

CIGAR LIGHTER FOR USE IN AUTOMOTIVE VEHICLES

Edward S. Hiscar, Pittsburgh, Pa.

Application May 29, 1951, Serial No. 228,915

12 Claims. (Cl. 219—32)

1

This invention relates to cigar lighters and particularly to an improvement in cigar lighters for use primarily in automotive vehicles.

One of the principal objects of my invention is to provide a cigar lighter of the wireless type which carries a lamp integral with the lighter, which lamp may be operated without the use of special receptacles or grounding devices and without holding the light in the socket by hand.

Another object of my invention is to provide a cigar lighter of the wireless type having a lamp thereon which uses the socket contacts of a conventional dashboard cigar lighter.

A further object of the invention is to provide a cigar lighter and lamp combination having a manually operable, axially slidable contactor pin which carries current from the conventional current stud of a lighter socket to a lamp.

Still another object is to provide a cigar lighter and lamp combination in which the lamp is automatically shut off when the cigar lighter is forced into the socket to contact the heating element.

Another object is to provide an extension light operable out of the socket of a conventional cigar lighter socket.

Other objects of the invention will become apparent to those skilled in the art after consideration of the following description and reference to the accompanying drawings.

Cigar lighters of the so-called wireless type in which the igniting unit is removed from the holding device or receptacle for use are quite common and are usually mounted on the dashboard of automotive vehicles. In their usual form such lighters have a receptacle or holding device which is mounted on the dashboard. A current carrying stud is mounted centrally of the holding device to carry electrical current to the receptacle. A removable igniting unit carrying a heating unit is slidably mounted in the receptacle. This igniting unit is normally out of contact with the current carrying stud but is adapted to contact the stud when the igniting unit is inserted into the receptacle beyond its normal position. When inserted into the receptacle sufficiently far to contact the current carrying stud, the heating unit picks up current from the stud and carries it to the ground through the shell of the igniting unit thereby being heated to red heat.

Various attempts have been made to take conventional cigar lighters of the type described above and affix to them a lamp whereby advantage could be taken of the wiring already in existence at the cigar lighter to operate the

2 lamp. All of these attempts have been directed towards the use of additional grounding abutments in the receptacle itself so that a special receptacle was needed in order to use the lamp means in conjuction with the lighter. All of these attempts have been relatively unsuccessful partially because of this requirement for a special receptacle and holding device, and partially because it was necessary to hold the light at all times in order to cause it to function.

I have invented a new and novel ignition unit and lamp means which can be operated in a conventional holding means and receptacle without need for any alterations in the receptacle or its replacement with a new and special one. Moreover, the lamp means of this invention can be locked in operative position so that it is not necessary to hold it at all times.

My invention may be generally stated as an improvement in cigar lighters of the type described and it comprises generally a lamp means mounted on the end of the igniting unit opposite the heating unit, sliding contact means mounted centrally of the igniting unit and slidable axially thereof to contact the current carrying stud to connect it to the lamp means and manually operable means for sliding said contact means.

A more complete understanding of this invention may be had by referring to the accompanying drawings in which:

Figure 1 is a longitudinal section through an igniting unit and lamp means of my invention.

Figure 2 is an enlarged longitudinal section of a segment of the unit shown in Figure 1 and taken on the same line.

Figure 3 is an elevational view of a segment of the unit shown in Figure 1 showing the manual means for operating the contact.

Figure 4 shows an extension light applicable for use with the igniting unit and lamp of my invention.

Figure 5 shows a plan view of a heating unit as used in the igniting unit of my invention.

Figure 6 is a side elevation partly cut away to show the contact and stud mechanism in normal position.

Figure 7 is a side elevation partly cut away to show the cigar lighter in operative position.

Referring first to Figure 1, there is shown a receptacle and holding device 10 of conventional design mounted in the dashboard 11 of an automotive vehicle. The receptacle and holding device has a current carrying stud 12 fixed centrally therein and connected to a source of electric energy in the usual manner. This receptacle device is conventional and is not deemed to need further explanation.

The igniting unit and lamp means are preferably assembled as shown in Figure 1 and comprise generally a tubular body of insulating material 13 having a reduced neck 14 at one end thereof. A friction sleeve 15 is mounted on the reduced neck 14 and held thereon by a spring 16 and annular ring 17. The sleeve 15 preferably has a flared end 18 which limits the movement into the receptacle 10. A contact ring 19 is mounted in the other end of the tubular body 13 and furnishes the ground contact for the heating element 20 which surrounds a hollow stud 21 on the center of the contact ring 19. A contact cup 22 in turn surrounds the heating element and is insulated from the contact ring 19 and the heating element 20 except at one end of the heating element where the contact cup 22 and heating element 20 make contact. The tubular body 13 is threaded internally to threadingly engage a cylindrical member 23. A light reflector or hood 24 is threaded onto the other end of the cylindrical member 23 to hold the ring 17 between it and the tubular body. The light reflector has a slot 25 through which light can escape from its interior. A lamp socket 26 is mounted in the reflector 24 to take a conventional lamp bulb 27 (a bayonet type, conventional in automotive vehicles is shown in Figure 1). A contactor pin 28 is mounted centrally of the lamp socket 26 and passes through an opening 29 therein and is insulated therefrom by an insulating ring 30. A spring 31 tends to force the end of the contact pin 28 against the contact of the lamp bulb 27. The contact pin 28 extends through the opening 29 and a substantial distance axially of the cylindrical member 23. The cylindrical member 23 is preferably provided with a larger bore 32 at its end nearest the heating unit. A contactor pin 33 is slidably mounted therein for axial movement and is spaced from the walls of the bore 32 by an insulating cup 34. The pin 33 passes through an opening 35 in the center of the heating element and is insulated therefrom by a sleeve 36 of insulating material. A second insulating cup 37 surrounds the pin 33 at its end nearest the heating unit and a spring 38 surrounds the pin 33 and engages the cups 37 and 34 to tend to force the pin into the bore 32. A cylindrical contactor member 39 is axially slidable in the bore 40 of lesser diameter in the cylindrical member 23. This cylindrical contactor member is made up of an external sleeve 41 of insulating material and a conducting sleeve 42 which surrounds the contactor pin 28 and is in contact therewith. This conductor sleeve 42 also contacts the end of contactor pin 33. A control arm 43 is mounted in the insulating sleeve and moves in a slot 44 in the reflector to move the contact member 39 axially within the cylindrical member 23. A ball lock 45 is provided in the reflector hood 24 to enter a well 46 in the control arm 43 to lock it when the light is turned on (see Fig. 2).

In the normal position with the lamp inoperative, the structural parts will have the relative positions shown in Figure 1 with the contactor pin 33 retracted to a point where its end is flush with the face of the heating unit 20. When it is desired to use the lamp, the control arm 43 is pushed to the left viewing Figures 1, 2, and 3 carrying with it the contactor sleeve 39. When the control arm reaches its extremity in the slot 44, the well 46 therein engages the ball 45 and the arm is held in position. With the control arm to the left, the contactor sleeve 39 forces the contactor pin 33 against the force of the spring 38 to project out of the insulating sleeve 36 and beyond the face of the heating unit 20 into contact with the current carrying stud 12. Current there flows from the stud 12, through pin 33, conducting sleeve 42, pin 28 into the lamp bulb 27.

An extension circuit for use with this invention is shown in Figure 4. A base 47 of proper type to engage the receptacle 26 (here a bayonet type base) is provided with wires 48 which extend to a lamp 49. This extension circuit can be used with the present invention by fixing the base 47 in the receptacle 26 and moving the control arm 43 into the locked position with well 46 engaging ball 45. The extension circuit can then be used anywhere about the vehicle.

When it is desired to use the cigar lighter, the hood 24 is pushed into the flared end 18 of the sleeve 15, carrying with it the tubular body 13 and the contact cup 22 until the contact cup 22 comes into the bimetallic clips 43 affixed to the current carrying stud 12. If the control arm 43 is in the forward position with the lamp lighted when the cigar lighter is pressed into the sleeve 15, the flared end 18 of the sleeve contacts the control arm 43 and forces it out of engagement with the ball lock 45 whereupon the spring 37 forces the contactor pin 33 out of contact with the stud 12 shutting off the current to the light bulb 27. (See Figure 7.) After the lighter has reached the desired temperature the radiated heat from the element 20 causes them to expand out of contact with the contact cup 22, thereby releasing the cup 22 whereupon the spring 16 causes the hood 24 and body 13 to spring out into their normal position (Figure 6).

While there is illustrated in the drawings and described in the specification a particular preferred embodiment of my invention it will be understood that it may be otherwise embodied within the scope of the following claims.

I claim:

1. In a cigar lighter having a receptacle means and holding device with a current carrying stud mounted centrally thereof and connected to a source of energy and an igniting unit insertable into said receptacle and holding device, said igniting unit having a heating element secured to one end thereof normally out of contact with the current carrying stud, said heating element being adapted to receive current from the current carrying stud when the igniting unit is inserted into the holding device beyond its normal position, the improvement comprising a lamp means mounted on the end of the igniting unit opposite the heating unit, sliding contact means mounted centrally of the igniting unit and slidable axially thereof through the heating element with the igniting unit in normal position to contact the current carrying stud to connect it to the lamp means and manually operable means for sliding said contact means.

2. A cigar lighter improvement as claimed in claim 1 in which the sliding contact means has resilient means tending to force it out of contact with the current carrying stud means.

3. A cigar lighter improvement as claimed in claim 1 in which the sliding contact means is mounted in a cylindrical member passing axially of the igniter unit, said contact means being insulated from the cylindrical member and from the igniter unit and slidable axially with respect thereto to contact the current carrying stud to connect it to the lamp means.

4. A cigar lighter improvement as claimed in claim 1 in which the contact means passes through the center of the heating unit and is insulated therefrom.

5. In a cigar lighter having a receptacle means and holding device with a current carrying stud mounted centrally thereof and connected to a source of energy and an igniting unit insertable into said receptacle and holding device, said igniting unit having a heating element secured to one end thereof normally out of contact with the current carrying stud, said heating element being adapted to receive current from the current carrying stud when the igniting unit is inserted into the holding device beyond its normal position, the improvement comprising a light reflector and hood means mounted on the end of the igniting unit opposite the heating unit, said light reflector and hood having an opening therein to direct light in a particular direction, lamp means mounted in said light reflector and hood means, sliding contact means mounted centrally of the igniting unit and slidable axially thereof through the heating element with the igniting unit remaining in normal position to contact the current carrying stud to connect it to the lamp means and manually operable means for sliding said contact means.

6. A cigar lighter improvement as claimed in claim 5 in which the sliding contact means comprises a cylindrical member mounted axially of the igniter unit, a spring loaded contactor member mounted in one end thereof and insulated therefrom and slidable axially with respect thereto, said contactor member passing through the center of the heating unit and insulated therefrom, a second hollow contactor member mounted in the opposite end of the cylindrical member and insulated therefrom, said second member being axially slidable with respect thereto and in electrical contact with the first contactor member, said second member surrounding and slidably contacting a contactor pin resiliently held in electrical contact with the lamp means.

7. A cigar lighter improvement as claimed in claim 5 in which the manually operable means for sliding the contact means is a pin extending through a slot in the hood means and slidable therein to force the contactor means into contact with the current carrying stud.

8. A cigar lighter improvement as claimed in claim 6 in which the cylindrical member has a bore of larger diameter adjacent the heating unit within which the first contactor member is slidably mounted.

9. A cigar lighter improvement as claimed in claim 5 having cooperating locking means on said manually operable means and said light reflector and hood to retain the contact means in contact with the current carrying stud.

10. In a cigar lighter having a receptacle means and holding device with a current carrying stud mounted centrally thereof and connected to a source of electrical energy, a combination igniting device and lamp comprising a tubular insulating body having a heating element fixed in one end thereof, said body being of such size and shape as to fit within the receptacle means, a central axially extending cylinder member engaging said tubular body, a light reflecting hood fixed to said cylindrical member adjacent the tubular body, lamp means in said hood, axially slidable contact means mounted in the cylindrical member, said contact means being slidable through the heating element to contact the current carrying stud to connect it to the lamp means and manually operable means for sliding said contact means.

11. In a cigar lighter having a receptacle means, a holding device with a current carrying stud mounted centrally thereof and connected to a source of electrical energy and an igniting device insertable into said receptacle and holding device, said igniting device having a heating element secured to one end thereof normally out of contact with the current carrying stud, said heating element being adapted to receive current from the current carrying stud when the igniting device is inserted into the holding device beyond its normal position and a spring loaded means engaging the receptacle means tending to resist the insertion of the igniting device into the receptacle beyond its normal position, the improvement comprising a lamp means mounted on the end of the igniting unit opposite the heating element, sliding contact means mounted centrally of the igniting unit and slidable axially thereof through the center of the heating element to contact the current carrying stud to connect it to the lamp means, manually operable means for sliding said contact means and locking means for holding the manually operable means with the contact means in contact with the current carrying stud, said manually operable means being so positioned on the igniting unit that insertion of the heating element into contact with the current carrying stud causes the spring loaded means engaging the receptacle means to release the locking means and thereby the manually operable means.

12. A cigar lighter improvement as claimed in claim 11 in which the spring loaded means engaging the receptacle means is a spring loaded cup shaped member engaging the receptacle and against which the manually operable means is forced when the heating element is forced into the receptacle beyond its normal position.

EDWARD S. HISCAR.

REFERENCES CITED

The following references are of record in the file of this patent:

UNITED STATES PATENTS

| Number | Name | Date |
|---|---|---|
| 1,144,172 | Collier | June 22, 1915 |
| 1,940,463 | Rintels | Dec. 19, 1933 |
| 2,207,601 | Shakespeare et al. | July 9, 1940 |
| 2,220,607 | Mayo | Nov. 5, 1940 |
| 2,260,588 | Smith | Oct. 28, 1941 |
| 2,270,564 | Schroeder | Jan. 20, 1942 |
| 2,473,890 | Kroll et al. | June 21, 1949 |
| 2,514,171 | Waltner | July 4, 1950 |